No. 764,676. PATENTED JULY 12, 1904.
A. PROUVOST.
WHEEL FOR VEHICLES.
APPLICATION FILED DEC. 16, 1903.
NO MODEL.
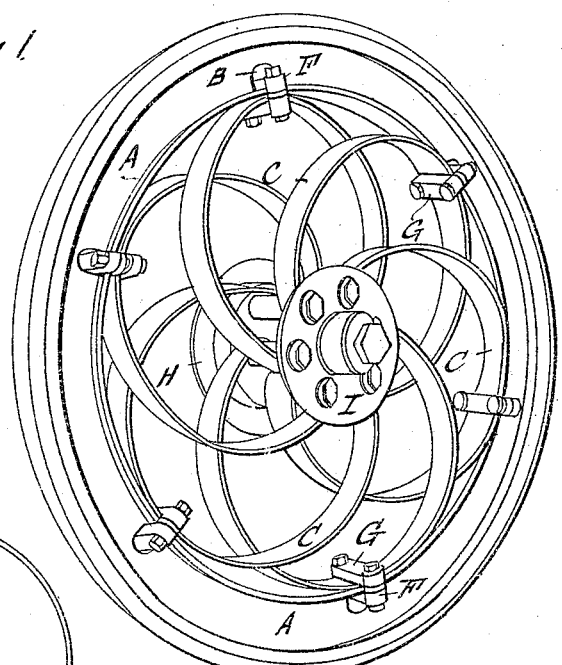
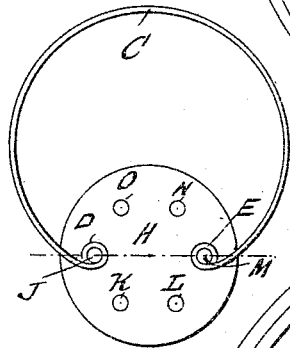
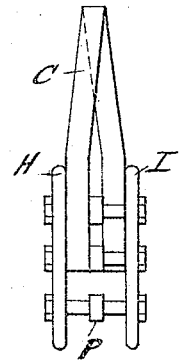
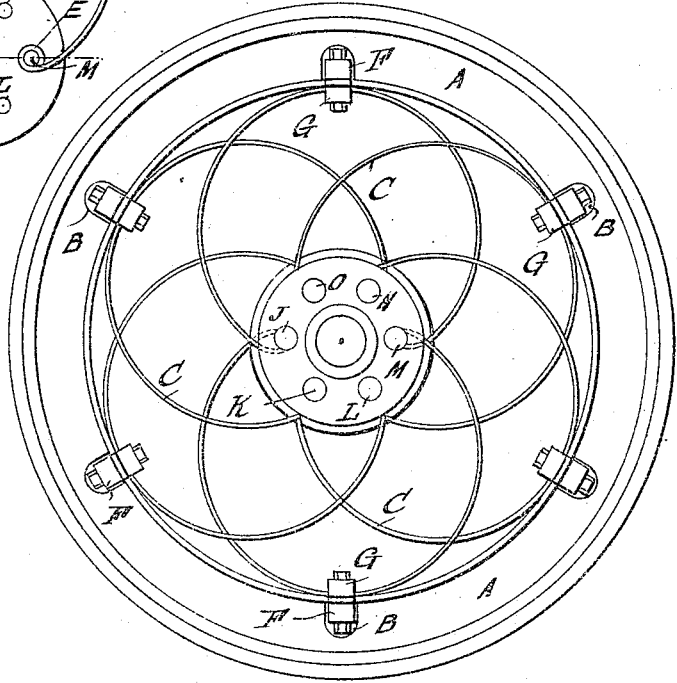
Witnesses
Inventor
Alphonse Prouvost
By his Attorney No. 764,676.

Patented July 12, 1904.

UNITED STATES PATENT OFFICE.

ALPHONSE PROUVOST, OF TOURCOING, FRANCE.

WHEEL FOR VEHICLES.

SPECIFICATION forming part of Letters Patent No. 764,676, dated July 12, 1904.

Application filed December 16, 1903. Serial No. 185,410. (No model.)

*To all whom it may concern:*

Be it known that I, ALPHONSE PROUVOST, a citizen of the French Republic, and a resident of Tourcoing, France, have invented certain new and useful Improvements in Wheels for Vehicles, of which the following is a specification.

The present invention relates to improvements in wheels for motor-cars and other vehicles; and it consists in the use of elastic spokes of special shape and arrangement and in the method of connecting the said spokes to the hub and the rim or felly, respectively.

In the annexed drawings, Figure 1 is a perspective view of the improved wheel; Fig. 2, a side view thereof; Fig. 3, a side view of a spoke connected to the hub, and Fig. 4 is a front view of the said spoke and hub.

The rim or felly A of the wheel is of solid metal, and consequently not liable to be pressed out of shape. It is formed of a bar of combined U and T section. In the said felly apertures B are provided for connecting the spokes thereto in the manner which will be hereinafter described. Each spoke consists of a metal hoop C, which forms a flexible but strong spring, the ends of which are bent to form eyes or rings D E.

In order to prevent the fracture of the spring-spokes C, the central part of each spoke is connected to the felly by means of a steel clamp consisting of two parts F G. The part F is placed for this purpose into one of the recesses B and connected to the part G by means of bolts, the spring-spoke being inclosed by the clamp, and thus held within the felly.

Two lateral plates H I are integral with the hub of the wheel and are connected to each other by six bolts J K L M N O, which engage the eyes or rings D E of the spokes C, so that the latter are pivoted to the said bolts. In order to give the spokes the necessary strength for transmitting to the felly the movement which they receive from the hub, it is necessary to pivot the ends of each spoke as far as possible apart. For this purpose the said ends are connected to bolts which are diametrically opposite each other. As will be seen from Fig. 3, the left-hand ring D and the right-hand ring E of one spoke are connected to bolts J M at opposite points of the diameters of the plates H I. The large radius of curvature of the spring-spokes C imparts to the latter very great elasticity with regard to perimetric forces acting radially or tangentially. To impart to the wheel resistance to lateral forces, the ends of each spoke are pivoted in different planes, as shown in Fig. 4. If, for instance, the left-hand end of a spoke abuts against the plate H, say, on the outside of the wheel, the right-hand end of the same spoke connected to the bolt diametrically opposite the bolt supporting the other end abuts against the plate I on the inside of the wheel. The ends of the spoke are kept in these different planes by a ring or collar P, fixed to the central part of each bolt, or by a central plate. The same bolt which supports at one end, say, the right-hand end of one spoke, supports at its other end the left-hand end of another spoke, so that only six bolts are necessary for supporting the twelve ends of six spokes which are thus staggered or cross one another.

I declare that what I claim is—

1. In a wheel the combination of a rim, a hub comprising two lateral plates and bolts connecting said plates, a plurality of circularly-bent spring-spokes having their ends formed as eyes adapted to surround said bolts at diametrically opposite points and in different planes and means for attaching the spokes to the rim substantially as described.

2. In a wheel, the combination of a rim of combined U and T section, a hub comprising two lateral plates and bolts connecting said plates; a plurality of circularly-bent spring-spokes having their ends formed as eyes adapted to surround said bolts at diametrically opposite points and in different planes, means on said bolts for securing the ends of the spokes in their proper plane and means for attaching the spokes to the rim, substantially as described.

3. In a wheel, the combination of a rim of combined U and T section and having recesses therein, a hub comprising two lateral plates and bolts connecting said plates, a plurality of circularly-bent spring-spokes having their ends formed as eyes, adapted to surround said bolts at diametrically opposite points and in different vertical planes, collars on said bolts for securing the ends of the spokes in their proper plane and means for attaching the spokes to the rim at their central part substantially as described.

4. In a wheel, the combination of a rim of combined U and T section and having recesses therein, a hub comprising two lateral plates and bolts connecting said plates, a plurality of circularly-bent spring-spokes having their ends formed as eyes adapted to surround said bolts at diametrically opposite points and in different vertical planes, collars on said bolts for securing the ends of the spokes in their proper plane and a bipartite clamp arranged in said recesses in the rim for attaching the spokes to the rim at their central part, the aforesaid bolts each engaging one end of one spoke and the opposite end of another spoke, substantially as described.

In witness whereof I have signed this specification in the presence of two witnesses.

ALPHONSE PROUVOST.

Witnesses:
 ALFRED CATELT,
 W. P. ATWELL.